US011338635B2

(12) United States Patent
Abram et al.

(10) Patent No.: US 11,338,635 B2
(45) Date of Patent: May 24, 2022

(54) MULTI-LEG CONTROL ARM FOR A WHEEL SUSPENSION IN A VEHICLE

(71) Applicant: Benteler Automobiltechnik GmbH, Paderborn (DE)

(72) Inventors: Thomas Abram, Paderborn (DE); Geir Linnerud, Lena (NO); Frode Paulsen, Gjøvik (NO)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 16/812,096

(22) Filed: Mar. 6, 2020

(65) Prior Publication Data

US 2020/0298644 A1    Sep. 24, 2020

(30) Foreign Application Priority Data

Mar. 19, 2019    (DE) .................... 10 2019 106 937.8

(51) Int. Cl.
*B60G 7/00*    (2006.01)
*B60G 7/02*    (2006.01)

(52) U.S. Cl.
CPC .............. *B60G 7/001* (2013.01); *B60G 7/02* (2013.01); *B60G 2206/12* (2013.01)

(58) Field of Classification Search
CPC ...... B60G 7/001; B60G 7/02; B60G 2206/12; B60G 2204/143; B60G 2200/4622; B60G 7/00

See application file for complete search history.

(56) References Cited

U.S. PATENT DOCUMENTS

| 3,139,275 A * | 6/1964 | Burkitt ..................... B60G 7/02 267/254 |
| 5,398,411 A * | 3/1995 | Kusaka .................... B23P 13/04 280/124.134 |
| 5,598,736 A * | 2/1997 | Erskine .................. B21D 7/022 72/389.6 |
| 2007/0051434 A1* | 3/2007 | Resiak .................... C22C 38/12 148/333 |
| 2012/0299263 A1* | 11/2012 | Mielke ................... B60G 7/001 280/124.134 |

(Continued)

FOREIGN PATENT DOCUMENTS

| DE | 10 2017 200 675 A1 | 7/2018 |
| DE | 10 2018 003 567 A1 | 10/2018 |
| EP | 3 530 497 A1 | 8/2019 |

*Primary Examiner* — Darlene P Condra
(74) *Attorney, Agent, or Firm* — Holland & Hart LLP

(57) ABSTRACT

A multi-leg control arm for a wheel suspension in a vehicle, includes first and second control arm legs coupling the multi-leg control arm to an axle carrier, and third and fourth control arm legs coupling the multi-leg control arm to a wheel carrier. The first and/or third control arm leg comprises a first elongated hole, and the second and/or fourth control arm leg comprises a second elongated hole. The first and second elongated holes are aligned with one another and define a movement path of the multi-leg control arm with respect to the axle carrier or the wheel carrier. At least one fastening element penetrates the first and second elongated holes and is adapted to fix the multi-leg control arm with respect to the axle carrier or the wheel carrier in a movement position on the movement path to set a control arm camber or a control arm track.

17 Claims, 4 Drawing Sheets

(56) References Cited

U.S. PATENT DOCUMENTS

| | | | |
|---|---|---|---|
| 2016/0121676 A1* | 5/2016 | Drabon | B60G 7/02 |
| | | | 280/124.125 |
| 2019/0092115 A1* | 3/2019 | Paulsen | B60G 7/001 |
| 2019/0263207 A1* | 8/2019 | Krolo | B21D 28/32 |
| 2019/0291781 A1* | 9/2019 | Bierbaumer | B62D 65/02 |

* cited by examiner

MULTI-LEG CONTROL ARM FOR A WHEEL SUSPENSION IN A VEHICLE

CROSS-REFERENCE

The present application claims the benefit of German Patent Application No. 10 2019 106 937.8, filed Mar. 19, 2019, entitled "Mehrschenkliger Lenker für eine Radaufhängung in einem Fahrzeug," which is incorporated herein by reference for all purposes.

FIELD OF THE DISCLOSURE

The present disclosure relates to a multi-leg control arm for a wheel suspension in a vehicle, in particular a transverse control arm, trailing arm, a two-point spring control arm or a three-point spring control arm, and a method for producing the multi-leg control arm.

BACKGROUND

Control arms for a wheel suspension of a vehicle are mechanically connected to the wheel suspension and to the chassis of the vehicle and serve to stabilize the wheel suspension connected to a wheel of the vehicle. Corresponding control arms comprise to be adjusted with regard to the geometry of the axle carrier during assembly in order to compensate for manufacturing tolerances and to ensure the desired driving properties and to ensure advantageous fastening of the control arm within the vehicle.

U.S. Pat. No. 8,746,714 B2 discloses the use of an eccentric to adjust the length of an upper control arm for use in a vehicle suspension.

U.S. Pat. No. 5,398,411 A discloses a method for producing a suspension for a vehicle.

SUMMARY

It is an object of the present disclosure to provide an improved control arm and control arm connection for a wheel suspension in a vehicle.

This object is solved by the features of the independent claims. Advantageous examples of the disclosure are the subject matter of the dependent claims, the description and the accompanying drawings.

The present disclosure is based on the finding that the above object can be achieved in that a multi-leg control arm can be used with a first and second control arm leg, and a third and fourth control arm leg. A corresponding multi-leg control arm enables an advantageous fixation of the multi-leg control arm at the axle carrier and at the wheel carrier of the vehicle.

Elongated holes aligned with one another are formed in the respective control arm legs, which are connected to the axle carrier or the wheel carrier, wherein at least one fastening element penetrates the elongated holes and is adapted to fix the multi-leg control arm with respect to the axle carrier or the wheel carrier in a movement position on the movement path in order to set the control arm camber and/or track. When adjusting the multi-leg control arm in relation to the axle carrier, the elongated geometry of the elongated holes enables the fastening element to be displaced within the elongated holes along a movement path in order to be able to adjust the control arm camber and/or track.

According to a first aspect, the disclosure relates to a multi-leg control arm for a wheel suspension in a vehicle, which comprises a first control arm leg and a second control arm leg, wherein the first control arm leg and the second control arm leg are adapted to couple the multi-leg control arm to an axle carrier of the vehicle, and which comprises a third control arm leg and a fourth control arm leg, wherein the third control arm leg and the fourth control arm leg are adapted to couple the multi-leg control arm to a wheel carrier of the vehicle, wherein the first control arm leg and/or third control arm leg comprises an elongated hole, wherein the second control arm leg and/or fourth control arm leg comprises an additional elongated hole, wherein the elongated hole and the additional elongated hole are aligned with respect to each other, wherein the elongated hole and the additional elongated hole define a movement path of the multi-leg control arm with respect to the axle carrier and/or with respect to the wheel carrier; and wherein the multi-leg control arm comprises at least one fastening element, which penetrates the elongated hole and the additional elongated hole and is adapted to fix the multi-leg control arm with respect to the axle carrier and/or with respect to the wheel carrier in a movement position on the movement path, in order to set the control arm camber and/or track.

The technical advantage is thereby achieved that the at least one fastening element, which penetrates the elongated hole and additional elongated hole advantageously fixes the multi-leg control arm with respect to the axle carrier or with respect to the wheel carrier in the movement position on the movement path in order to set the control arm camber and/or track.

This ensures an effective coupling between the first and second control arm legs and the axle carrier, and between the third and fourth control arm legs and the wheel carrier.

In particular, the first control arm leg and the second control arm leg effectively surround the axle carrier of the vehicle, so that a particularly advantageous positioning of the axle carrier between the first and second control arm legs of the multi-leg control arm can be ensured.

In particular, the third control arm leg and the fourth control arm leg effectively surround the wheel carrier of the vehicle, so that a particularly advantageous positioning of the wheel carrier between the third and fourth control arm legs of the multi-leg control arm can be ensured.

The respective elongated hole formed in the respective control arm leg defines a movement path of the multi-leg control arm with respect to the axle carrier or wheel carrier, so that the control arm can be advantageously adjusted with regard to the geometry of the axle carrier or wheel carrier.

In particular, a direction of extension of the elongated hole and the additional elongated hole corresponds to the movement path of the multi-leg control arm with respect to the axle carrier and/or with respect to the wheel carrier.

The at least one fastening element, which penetrates the elongated hole and the additional elongated hole, fixes the multi-leg control arm with respect to the axle carrier or wheel carrier in a specific movement position on the movement path defined by the shape of the elongated holes in order to set the control arm camber and/or track. Thus, the multi-leg control arm ensures a mechanically stable connection of the multi-leg control arm to the axle carrier or wheel carrier, whereby an advantageous adjustment of the multi-leg control arm with respect to the axle carrier or wheel carrier is made possible.

In one example, the multi-leg control arm comprises a single fastening element, wherein the single fastening element penetrates a first elongated hole formed in the first control arm leg and a second elongated hole formed in the second control arm leg, which is aligned with the first elongated hole, wherein the single fastening element is adapted to fix the multi-leg control arm in respect to the axle carrier in a movement position on the movement path in order to set the control arm camber and/or track, or wherein the single fastening element penetrates a third elongated hole formed in the third control arm leg and a fourth elongated hole formed in the fourth control arm leg, which is aligned with the third elongated hole, wherein the single fastening element is adapted to fix the multi-leg control arm with respect to the wheel carrier in a movement position on the movement path in order to set the control arm camber and/or track.

The technical advantage is thereby achieved that the single fastening element enables either an effective fixing of the multi-leg control arm on the wheel carrier or on the axle carrier. In particular, the first and second control arm legs, which are not fixed to the axle carrier by the single fastening element, or the third and fourth control arm legs, which are not fixed to the wheel carrier by the single fastening element, are fixed to the axle carrier or wheel carrier by a bearing, in particular a rubber bearing.

In one example, the multi-leg control arm comprises a first fastening element and a second fastening element, wherein the first fastening element penetrates a first elongated hole formed in the first control arm leg and a second elongated hole formed in the second control arm leg, which is aligned with the first elongated hole, wherein the first fastening element is adapted to fix the multi-leg control arm with respect to the axle carrier in a movement position on the movement path in order to set the control arm camber and/or track, and wherein the second fastening element penetrates a third elongated hole formed in the third control arm leg and a fourth elongated hole formed in the fourth control arm leg, which is aligned with the third elongated hole, wherein the second fastening element is adapted to fix the multi-leg control arm with respect to the wheel carrier in a movement position on the movement path in order to set the control arm camber and/or track.

The technical advantage is thereby achieved that the use of two fastening elements enables an effective two-way movable fixing of the multi-leg control arm on the wheel carrier and on the axle carrier.

In one example, the multi-leg control arm comprises a first control arm end and a second control arm end facing away from the first control arm end, wherein the multi-control arm control arm in particular is curved along a longitudinal axis extending from the first to the second control arm end or is straight.

The technical advantage is thereby achieved that a curved or rectilinear extension of the multi-leg control arm ensures a particularly optimized absorption of forces acting on the multi-leg control arm.

In one example, the multi-leg control arm comprises guide elements, which are formed at the first, second, third and/or fourth control arm legs, wherein the at least one fastening element is adapted to bear against the guide elements in order to guide the multi-leg control arm with respect to the axle carrier and/or wheel carrier in the movement position on the movement path and to set the control arm camber and/or track, wherein the guide elements are formed in particular in one piece with the first, second, third and/or fourth control arm legs.

The technical advantage is thereby achieved that the fastening element bearing against the guide elements can advantageously set the control arm camber and/or track. In doing so, the guide elements can be formed exclusively at the first, second, third or fourth control arm legs, or the guide elements can be formed at all control arm legs or at certain selected control arm legs of the first, second, third or fourth control arm legs.

In particular, the guide elements are formed in one piece with the first, second, third and/or fourth control arm legs, in particular by a cold forging process. For details regarding the cold forging process, reference is made to the explanations relating to the method according to the second aspect.

In one example, the guide elements formed at the first, second, third and/or fourth control arm legs each comprise a first guide element and a second guide element, wherein the first guide element and the second guide element are arranged on sides of the respective elongated hole facing away from one another, and wherein first and second guide elements are arranged in particular on both sides of the respective elongated hole.

The technical advantage is thereby achieved that a particularly effective fixation of the multi-leg control arm in the movement position is ensured by the guide elements arranged on the sides of the respective elongated hole facing away from one another. In particular, the fastening element bears on the first guide element and on the second guide element in order to guide the multi-leg control arm with respect to the axle carrier or wheel carrier in the movement position on the movement path and to set the control arm camber and/or track.

In one example, the respective first and second guide elements extend at an angle, in particular at a right angle, to a direction of extension of the respective elongated hole, wherein the direction of extension of the respective elongated hole in particular corresponds to the movement path.

The technical advantage is thereby achieved that the angular, in particular right-angled, extension of the respective first and second guide elements relative to the direction of extension of the respective elongated hole ensures an particularly effective guidance of the multi-leg control arm in the movement position.

In one example, the guide elements are shaped as elevations, in particular ribs, rectangles, squares, triangles, and/or crescents, which are formed in particular at an outer side of the control arm of the respective control arm leg.

The technical advantage is thereby achieved that the guide elements adapted as elevations, in particular ribs, rectangles, squares, triangles and/or crescents, ensure an effective guiding of the fastening element received between the guide elements. The elevations, which are formed in particular on an outer side of the control arm of the respective control arm leg, ensure that the fastening element inserted into the respective elongated holes from the outside can advantageously bear against the elevations.

In one example, the at least one fastening element comprises a screw bolt and an eccentric element, in particular an eccentric disk, which is connected in a rotationally fixed manner to the screw bolt, wherein the screw bolt is guidable through a first elongated hole formed in the first control arm leg, through an axle carrier opening in the axle carrier and through a second elongated hole formed in the second control arm leg, in order to guide the multi-leg control arm with respect to the axle carrier in the movement position on the movement path and to set a control arm camber and/or track, and/or wherein the screw bolt is guidable through a third elongated hole formed in the third control arm leg, through a wheel carrier opening formed in the wheel carrier and through a fourth elongated hole formed in the fourth control arm leg in order to guide the multi-leg control arm with respect to the wheel carrier in the movement position on the movement path and to set a control arm camber and/or track, wherein in particular the eccentric element, in particular eccentric disk, which is connected in a rotationally fixed manner to the screw bolt, is adapted to bear against the guide elements in order to guide the multi-leg control arm with respect to the axle carrier and/or wheel carrier in the movement position on the movement path and to set the control arm camber and/or track.

The technical advantage is thereby achieved that the screw bolt guided through the first elongated hole, the second elongated hole and the axle carrier opening of the axle carrier ensures effective fastening of the multi-leg control arm to the axle carrier, or that the screw bolt, which is guided through the third elongated hole, the fourth elongated hole and the wheel carrier opening of the wheel carrier ensures an effective fixing of the multi-leg control arm to the wheel carrier. Here, the eccentric element, in particular the eccentric disc, fixes the multi-leg control arm with respect to the axle carrier and/or wheel carrier in the movement position on the movement path and sets the control arm camber and/or track, in particular in that the eccentric element, in particular the eccentric disc, bears against the guide elements.

Here, the at least one fastening element can comprise a single fastening element with a single screw bolt and a single eccentric element in order to ensure a movable fixing of the multi-leg control arm at the axle carrier or at the wheel carrier. Here, the at least one fastening element can comprise a first fastening element and a second fastening element, each of which comprises a screw bolt and an eccentric element, in order to ensure a movable fixing of the multi-leg control arm at the axle carrier and at the wheel carrier.

The eccentric element, in particular eccentric disk, which is connected in a rotationally fixed manner to the screw bolt, in particular comprises a connecting area which is connected to the screw bolt, wherein the connecting area is spaced apart from the center of the eccentric element, in particular eccentric disk. Thus, when the screw bolt is rotated, the eccentric element, in particular the eccentric disk, which is connected to the screw bolt in a rotationally fixed manner, is deflected to different extents depending on the angle of rotation of the screw bolt and thereby causes a movement of the multi-leg control arm on the movement path.

In one example, when the fastening element is rotated, the fastening element, in particular the eccentric element, which is connected in a rotationally fixed manner to the screw bolt fixed manner, slides along the guide elements in order to move the multi-leg control arm with respect to the axle carrier and/or wheel carrier along the movement path.

The technical advantage is thereby achieved that a particularly effective movement of the fastening element along the movement path is ensured by sliding the fastening element along the guide elements. Due to the non-rotatable connection between the eccentric element, in particular the eccentric disc, and the screw bolt, the eccentricity of the eccentric element during sliding along the guide elements causes the multi-leg control arm to move relative to the axle carrier or wheel carrier along the movement path.

In one example a fifth fastening opening is formed in the third control arm leg and a sixth fastening opening is formed in the fourth control arm leg, wherein the fifth and sixth fastening opening are arranged in alignment with one another, and wherein the multi-leg control arm comprises a component fastening element which penetrates the fifth and sixth fastening opening and a component opening of a vehicle component of the vehicle in order to fix the multi-leg control arm to the vehicle component.

The technical advantage is thereby achieved that the component fastening element penetrating the fifth and sixth fastening opening ensures a particularly effective fastening of the multi-leg control arm to the vehicle component.

In particular, the third elongated hole is arranged at a first control arm end of the multi-leg control arm and the fifth fastening opening is formed on a side of the third elongated hole facing away from a first control arm end, and in particular the fourth elongated hole is arranged at a first control arm end of the multi-leg control arm and the sixth fastening opening is formed on a side of the fourth elongated hole facing away from a first control arm end.

In one example, the respective elongated hole extends along a longitudinal direction of the multi-leg control arm, wherein the longitudinal direction of the multi-leg control arm extends from the first control arm leg to the third control arm leg opposite to the first control arm leg, wherein the at least one fastening element penetrates the first and second elongated hole and/or the third and fourth elongated hole and is adapted to guide the multi-leg control arm with respect to the axle carrier and/or wheel carrier in the movement position on a horizontal movement path extending along the longitudinal direction of the control arm in order to set the control arm camber and/or track.

The technical advantage is thereby achieved that the elongated holes extending along the longitudinal direction of the control arm define a horizontal movement path, so that by moving the multi-leg control arm along the horizontal movement path an effective horizontal adjustment of the multi-leg control arm with respect to the axle carrier and/or wheel carrier is ensured, before the fastening element fixes the multi-leg control arm in the movement position.

In one example, the respective elongated hole extends along a vertical direction of the multi-leg control arm, wherein the vertical direction of the control arm extends from a control arm lower side to a control arm top side of the multi-leg control arm, wherein the at least one fastening element penetrates the first and second elongated holes and/or the third and fourth elongated holes and is adapted to fix the multi-leg control arm with respect to the axle carrier and/or wheel carrier in the movement position on the vertical movement path extending along the vertical direction of control arm in order to set the control arm camber and/or track.

The technical advantage is thereby achieved that the elongated holes extending along the vertical direction of the control arm define a vertical movement path, so that an effective vertical adjustment of the multi-leg control arm with respect to the axle carrier and/or wheel carrier can be ensured before the fastening element fixes the multi-leg control arm in the movement position.

In one example, the multi-leg control arm comprises a first connecting section, which connects the first control arm leg and the third control arm leg, wherein the multi-leg control arm comprises a second control arm section, which connects the second control arm leg and the fourth control arm leg, and wherein the multi-leg control arm comprises a connecting element, in particular a connecting plate, which connects the first connecting section and the second connecting section.

The technical advantage is thereby achieved that the respective connecting sections, which connect the respective control arm legs, and the connecting element, in particular the connecting plate, provide a stable, multi-leg control arm.

In one example, the connecting element comprises a first connecting element edge, which is at least partially aligned flush with the first connecting section or which protrudes beyond the first connecting section, and/or wherein the connecting element comprises a second connecting element edge, which is at least partially aligned flush with the second connecting section, or which protrudes beyond the second connecting section.

The technical advantage is thereby achieved that a particularly advantageous and mechanically stable adaptation of the multi-leg control arm can be ensured by the appropriate adaptation of the respective connecting element edge.

In one example, the connecting element comprises at least one recess extending between the first and second control arm legs and/or third and fourth control arm legs, wherein in particular the at least one recess is adapted as a recess tapering from a control arm end of the multi-leg control arm.

The technical advantage is thereby achieved that by forming the at least one recess in the connecting element, the weight of the connecting element can be reduced without influencing the mechanical stability of the connecting element. In particular, the at least one recess tapers from a control arm end in the direction of a center point of the connecting element. In particular, the multi-leg control arm comprises two recesses, which are arranged in particular on opposing control arm ends of the multi-leg control arm and taper from the respective control arm ends in the direction of a center point of the connecting element.

In one example, a connecting element opening for receiving a spring support is arranged in the connecting element, wherein the connecting element opening is arranged in particular in a center point of the connecting element.

The technical advantage is thereby achieved that the connecting element opening enables an effective fastening of the spring support.

In one example, the first control arm leg comprises a first control arm leg center section which is arranged between the first control arm leg and the third control arm leg opposite the first control arm leg, and/or wherein the second control arm leg comprises a second control arm leg center section, which is arranged between the second control arm leg and a fourth control arm leg opposite to the second control arm leg, wherein in particular the first and second control arm leg center section extend towards each other.

The technical advantage is thereby achieved that the mechanically stable design of the multi-leg control arm is ensured by the formation of the corresponding control arm leg center sections.

In one example, the multi-leg control arm comprises a single fastening element, wherein the single fastening element penetrates a first elongated hole formed in the first control arm leg and a second elongated hole formed in the second control arm leg, which is aligned with the first elongated hole, wherein the single fastening element is adapted to fix the multi-leg control arm with respect to the axle carrier in a movement position on the movement path in order to set the control arm camber and/or track, or wherein the single fastening element penetrates a third elongated hole formed in the third control arm leg and a fourth elongated hole formed in the fourth control arm leg, which is aligned with the third elongated hole, wherein the single fastening element is adapted to fix the multi-leg control arm with respect to the wheel carrier in a movement position on the movement path, in order to set the control arm camber and/or track, wherein the multi-leg control arm comprises a bearing, in particular rubber bearing, which is adapted to couple the control arms legs, which are not fixed by the fastening element on the axle carrier or wheel carrier, with the axle carrier or wheel carrier.

This comprises the technical advantage that the use of a single fastening element ensures a particularly effective coupling of the multi-leg control arm to the axle carrier or wheel carrier, which coupling can be moved along the movement path, and that the use of the bearing results in a further advantageous connection of the control arm legs, which are not connected by the fastening element, of the multi-leg control arm with the axle carrier or wheel carrier. In particular, the single fastening element movably couples the multi-leg control arm to the axle carrier and the bearing, in particular plastic bearing, couples the multi-leg control arm to the wheel carrier, or in particular the single fastening element movably couples the multi-leg control arm to the wheel carrier and the bearing, in particular plastic bearing, couples the multi-leg control arm with the axle carrier.

According to a second aspect, the disclosure relates to a method for producing a multi-leg control arm for a wheel suspension in a vehicle, the method comprising the following method steps, providing a control arm precursor which comprises a first control arm leg and a second control arm leg, wherein the first control arm leg and the second control arm leg are adapted to couple the multi-leg control arm to an axle carrier of the vehicle, and which comprises a third control arm leg and a fourth control arm leg, wherein the third control arm leg and the fourth control arm leg are adapted to couple the multi-leg control arm to a wheel carrier of the vehicle; and forming an elongated hole in the first control arm leg and/or third control arm leg, and an additional elongated hole in the second control arm leg and/or fourth control arm leg, wherein the elongated hole and the additional elongated hole are aligned with one another in order to obtain the multi-leg control arm.

The technical advantage is thereby achieved that an advantageous production of the multi-leg control arm is ensured. In particular, the forming of the respective elongated hole comprises milling the respective elongated hole.

In one example, the method further comprises the step of forming guide elements at the first, second, third and/or fourth control arm legs, wherein the guide elements are formed in particular on sides of the respective elongated hole facing away from one another, and wherein the forming of the elongated holes is performed in particular after the forming of the guide elements.

The technical advantage is thereby achieved that the guide elements ensure effective fixing of the control arm camber and/or track by means of a fastening element of the multi-leg control arm.

In one example, the forming of the guide elements is performed as part of a cold forging process.

The technical advantage is thereby achieved that the cold forging process ensures an effective shaping of the guide elements in the multi-leg control arm.

In one example, the cold forging process comprises the application of a lower tool on a side of the multi-leg control arm facing away from the guide elements to be formed, the cold forging process comprises the application of an upper tool on a side of the multi-leg control arm facing towards the guide elements, wherein the upper tool comprises molding recesses, which correspond to the guide elements to be molded, and wherein the cold forging process comprises applying pressure to the lower tool and/or upper tool in order to form the guide elements in the molding recesses of the upper tool.

The technical advantage is thereby achieved that by applying pressure of the lower tool and/or upper tool the material of the multi-leg control arm is caused to flow into the corresponding molding recesses in order to form the guide elements in the mold recesses of the upper tool.

In one example, the cold forging process is carried out at a pressure of at least 200 t, in particular between 250 t and 400 t.

BRIEF DESCRIPTION OF THE DRAWINGS

Examples of the principles of this disclosure are explained in more detail with reference to the accompanying drawings.

DETAILED DESCRIPTION

Figure 1:
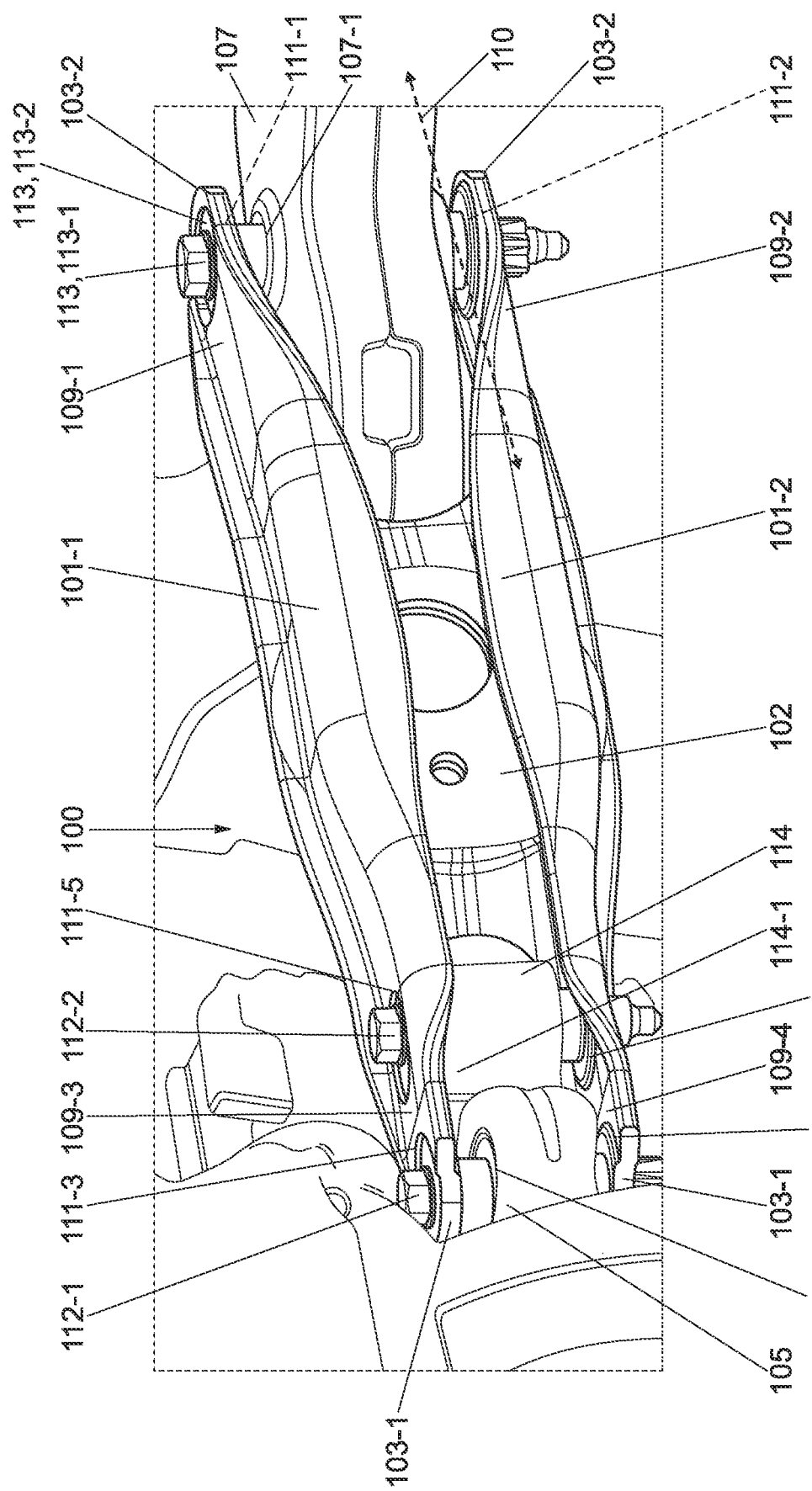
FIG. 1 shows a multi-leg control arm attached to a wheel carrier and to an axle carrier of a vehicle in a first view.

FIG. 1 shows a schematic depiction of a multi-leg control arm attached to a wheel carrier and to an axle carrier of a vehicle in a first view.

The multi-leg control arm 100 comprises a first connecting section 101-1 and a second connecting section 101-2. The multi-leg control arm 100 comprises a connecting element 102, which connects the first connecting section 101-1 and the second connecting section 101-2.

The first connecting section 101-1 connects a first control arm leg 109-1 to a third control arm leg 109-3 of the multi-leg control arm 100. The second connecting section 101-2 connects a second control arm leg 109-2 to a fourth control arm leg 109-4 of the multiple leg control arm 100.

As can be seen from FIG. 1, the first control arm leg 109-1 and the second control arm leg 109-2 are adapted to surround an axle carrier 107 of the vehicle, and the third control arm leg 109-3 and the fourth control arm leg 109-4 are connected to a wheel carrier 105 of the vehicle.

The multi-leg control arm 100 comprises a first control arm end 103-1 and a second control arm end 103-2 facing away from the first control arm end 103-1.

The first control arm leg 109-1 comprises a first elongated hole 111-1. The second control arm leg 109-21 comprises a second elongated hole 111-2. The first and second elongated holes 111-1, 111-2 are not visible in the view shown in FIG. 1 and are only shown schematically. In this case, the first elongated hole 111-1 and the second elongated hole 111-2 are arranged in alignment with one another and define a movement path 110 of the multi-leg control arm 100 with respect to the axle carrier 107, shown only schematically in FIG. 1.

A fastening element 113 penetrates the first and second elongated holes 111-1, 111-2 and an axle carrier opening 107-1 of the axle carrier 107 in order to fix the multi-leg control arm 100 to the axle carrier 107, in particular to fix the multi-leg control arm 100 with respect to the axle carrier 107 in a movement position on the movement path 110 in order to set the control arm camber and/or track.

The third control arm leg 109-3 and the fourth control arm leg 109-4 surround the wheel carrier 105 of the vehicle at least partially.

A third elongated hole 111-3 is in particular formed in the third control arm leg 109-3 and a fourth elongated hole 111-4 is in particular formed in the fourth control arm leg 109-4, wherein the third and fourth elongated holes 111-3, 111-4 are arranged in alignment with each another.

A wheel carrier fastening element 112-1 penetrates the third and fourth elongated holes 111-3, 111-4 and a wheel carrier opening 105-1 of the wheel carrier 105 in order to fix the multi-leg control arm 100 to the wheel carrier 105. In particular, the wheel carrier fastening element 112-1 can be adapted according to the fastening element 113.

In particular, a fifth fastening opening 111-5 is formed in the third control arm leg 109-3 of the multi-leg control arm 100. In particular, a sixth fastening opening 111-6 is formed in the fourth control arm leg 109-4 of the multi-leg control arm 100.

In particular, a component fastening element 112-2 penetrates the fifth and sixth fastening opening 111-5, 111-6 and a component opening 114-1 of a vehicle component 114 of the vehicle in order to fix the multi-leg control arm 100 to the vehicle component 114.

As seen in FIG. 1, the fifth fastening opening 111-5 is in particular formed at a side of the third elongated hole 111-3 facing away from the first control arm end 103-1 and the sixth fastening opening 111-6 is in particular formed at a side of the fourth elongated hole 111-4 facing away from the first control arm end 103-1.

The fastening element 113, which penetrates the first elongated hole 111-1 and the second elongated hole 111-2, which is only shown schematically in FIG. 1, is adapted to fix the multi-leg control arm 100 with respect to the axle carrier 107 in a movement position on the movement path 110, and in particular comprises a screw bolt 113-1 and an eccentric element 113-2, in particular an eccentric disk, which is connected to the screw bolt 113-1 in a rotationally fixed manner.

The bolt 113-1 of the fastening element 113 penetrates the first elongated hole 111-1, an axle carrier opening 107-1 of the axle carrier 107 and the second elongated hole 111-2 in order to fix the multi-leg control arm 100 to the axle carrier 107.

The eccentric element 113-2, in particular the eccentric disk, which is connected to the screw bolt 113-1 in a rotationally fixed manner, bears against guide elements of the first control arm leg 109-1 and the second control arm leg 109-2, which are not shown in FIG. 1, in order to fix the multi-leg control arm 100 with respect to the axle carrier 107 in the movement position on movement path 110.

Figure 3:
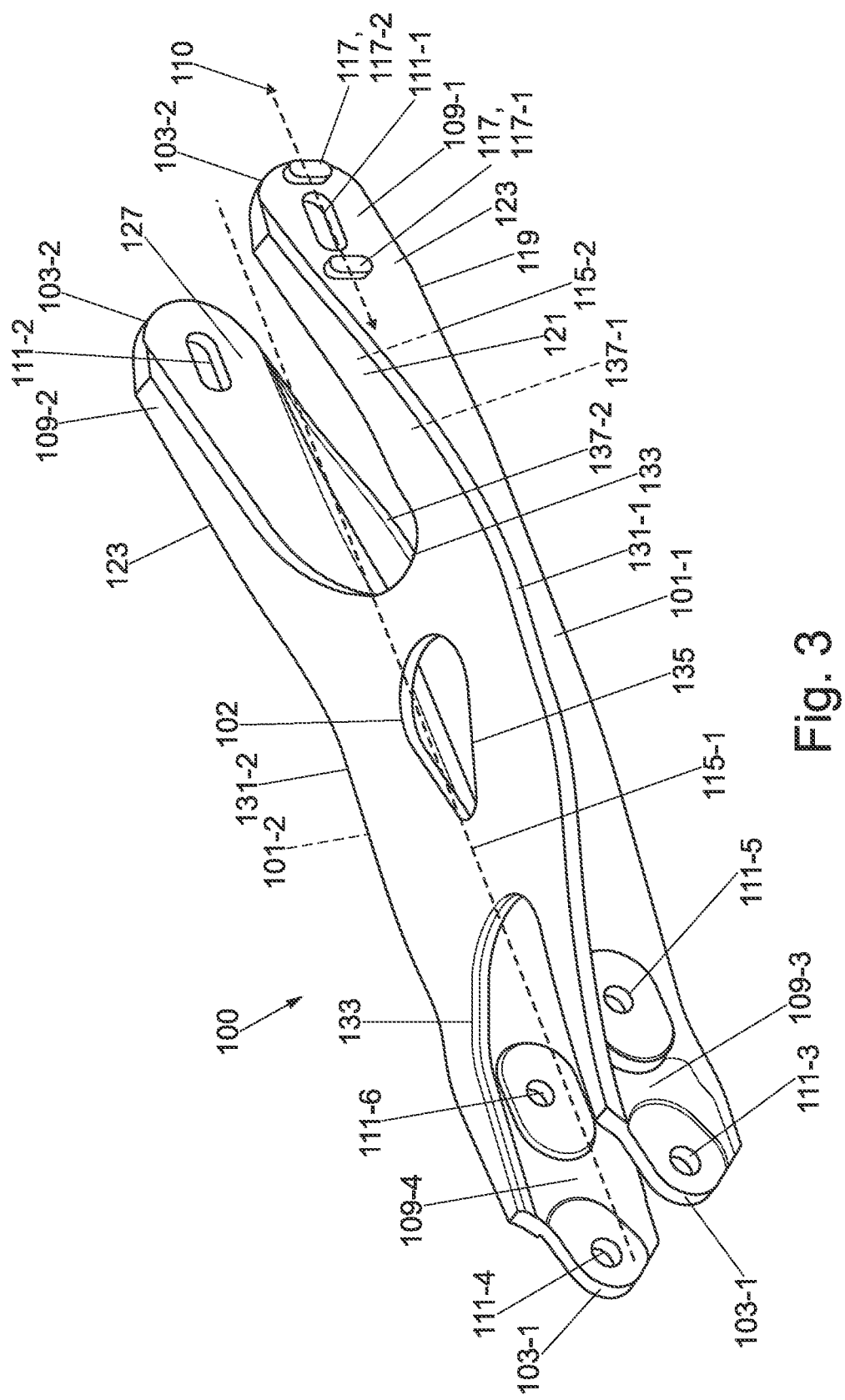
FIG. 3 shows a multi-leg control arm according to a first example.

For further details of the guide elements not shown in FIG. 1, reference is made to the explanations regarding the example shown in FIG. 3.

Figure 2:
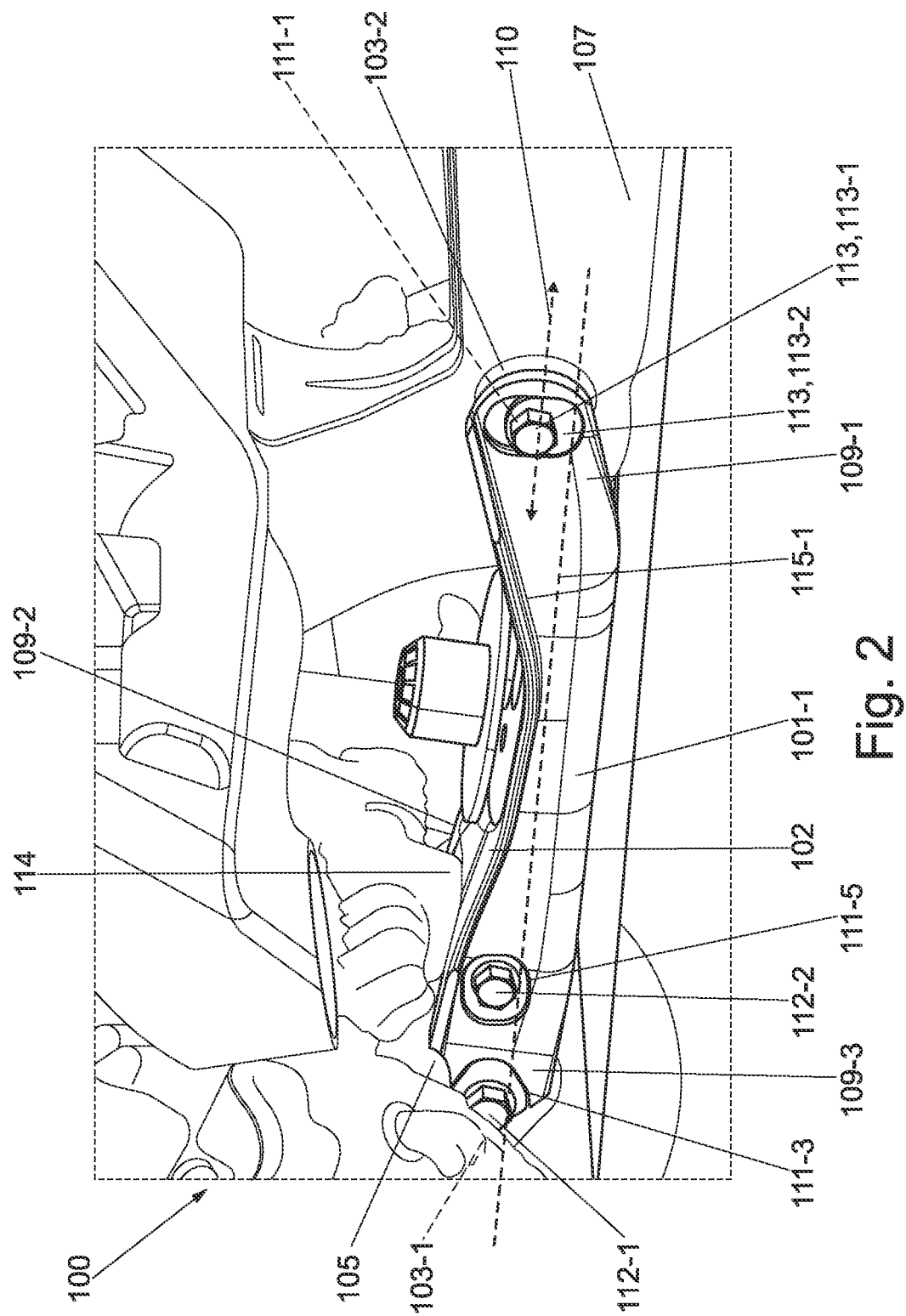
FIG. 2 shows a multi-leg control arm attached to a wheel carrier and an axle carrier of a vehicle in a second view.

FIG. 2 shows a multi-leg control arm attached to a wheel carrier and to an axle carrier of a vehicle in a second view.

The multi-leg control arm 100 shown in FIG. 2 corresponds to the multi-leg control arm 100 shown in FIG. 1. However, the multi-leg control arm 100 shown in FIG. 2 is, in comparison with the multi-leg control arm 100 shown in FIG. 1, rotated by approximately 90° around one axis corresponding to the longitudinal direction 115-1 of the control arm, wherein the longitudinal direction 115-1 of the control arm extends from a first control arm end 103-1 to a second control arm end 103-2 of the multi-leg control arm 100.

The first control arm leg 109-1 comprises a first elongated hole 111-1. The second control arm leg 109-1 comprises a second elongated hole 111-2. The first and second elongated holes 111-1, 111-2 are not visible in the view shown in FIG. 2 and are only shown schematically or not. In this case, the first elongated hole 111-1 and the second elongated hole 111-2 are arranged in alignment with one another and define a movement path 110 of the multi-leg control arm 100 with respect to the axle carrier 107, which is only shown schematically in FIG. 2.

The second control arm leg 109-2 is only shown partially in FIG. 2.

A fastening element 113 penetrates the first and second elongated holes 111-1, 111-2 and an axle carrier opening 107-1 of the axle carrier 107, which is not shown in FIG. 2, in order to fix the multi-leg control arm 100 to the axle carrier 107, in particular in order to fix the multi-control arm control arm 100 with respect to the axle carrier 107 in a movement position on the movement path 110 to set the control arm camber and/or track.

In this case, the fastening element 113 comprises in particular a screw bolt 113-1 and an eccentric element 113-2, in particular an eccentric disk, which is connected to the screw bolt 113-1 in a rotationally fixed manner. The screw bolt 113-1 of the fastening element 113 penetrates the first elongated hole 111-1, the axle carrier opening 107-1 of the axle carrier 107 and the second elongated hole 111-2 in order to fix the multi-leg control arm 100 to the axle carrier 107.

The eccentric element 113-2, in particular the eccentric disk, which is connected to the screw bolt 113-1 in a rotationally fixed manner, not shown in FIG. 2, is in contact with guide elements of the first control arm leg 109-1 and the second control arm led 109-2, in order to guide the multi-leg control arm 100 in respect to the axle carrier 107 in the movement position of the movement path 110.

For further details of the guide elements, which are not shown in FIG. 2, reference is made to the explanations regarding the example shown in FIG. 3.

As already explained with reference to FIG. 1, the multi-leg control arm 100 comprises a third control arm leg 109-3 with in particular a third elongated hole 111-3 and a fourth control arm leg 109-4 with in particular a fourth elongated hole 111-4, wherein the third and fourth control arm legs 109-3, 109-4 surround the wheel carrier 105 of the vehicle at least partially.

The second and fourth control arm legs 109-2, 109-4 are not shown in FIG. 2.

A wheel carrier fastening element 112-1 penetrates the third and fourth fastening openings 111-3, 111-4, which are arranged in alignment with one another, and a wheel carrier opening 105-1 of the wheel carrier 105 in order to fix the multi-leg control arm 100 to the wheel carrier 105.

In particular, a fifth fastening opening 111-5 is formed in the third control arm leg 109-3 of the multi-leg control arm 100. In particular, a sixth fastening opening 111-6 is formed in the fourth control arm leg 109-4 of the multi-leg control arm 100.

In particular, a component fastening element 112-2 penetrates the fifth and sixth fastening opening 111-5, 111-6 and a component opening 114-1 of a vehicle component 114 of the vehicle in order to fix the multi-leg control arm 100 to the vehicle component 114.

FIG. 3 shows a multi-leg control arm according to one example.

The multi-leg control arm 100 shown in FIG. 3 is shown without an axle carrier 107 of the vehicle and also without a wheel carrier 105 of the vehicle. The multi-leg control arm 100 shown in FIG. 3 is also shown without a fastening element 113, which is adapted to fix the multi-leg control arm 100 with respect to the axle carrier 107 in a movement position on the movement path 110 in order to set the control arm camber and/or track.

For details on this, reference is made to the explanations made with reference to FIGS. 1 and 2.

The multi-leg control arm 100 comprises a first connecting section 101-1 and a second connecting section 101-2 and comprises a connecting element 102, which connects the first connecting section 101-1 and the second connecting section 101-2.

The multi-leg control arm 100 comprises a first control arm end 103-1 and a second control arm end 103-2 opposite to the first control arm end 103-1.

The multi-leg control arm 100 comprises a first control arm leg 109-1 and a third control arm leg 109-3 facing away from the first control arm leg 109-1. The multi-leg control arm 100 comprises a second control arm leg 109-2 and a fourth control arm leg 109-4 facing away from the second control arm leg 109-2. A third attachment opening 111-3 is formed in the third control arm leg 109-3 and a fourth attachment opening 111-4 is formed in the fourth control arm leg 109-4. The third and fourth fastening openings 111-3 and 111-4 are arranged in alignment with one another.

A wheel carrier fastening element 112-1 passing through the third and fourth fastening opening 111-3, 111-4 and which is adapted to fasten the multi-leg control arm 100 to the wheel carrier 105 is not shown in FIG. 3.

Even if this is not shown in FIG. 3, in particular the third fastening opening 111-3 can be adapted as a third elongated hole 111-3 and the fourth fastening opening 111-4 as a fourth elongated hole 111-4. In particular, a further fastening element 113 penetrates the third and fourth elongated holes 111-3, 111-4 and is adapted to fix the multi-leg control arm 100 with respect to the wheel carrier 105 in a movement position on the movement path 110 in order to set the control arm camber and/or track.

A fifth fastening opening 111-5 is in particular formed in the third control arm leg 109-3, and in particular a sixth fastening opening 111-6 is formed in the fourth control arm leg 109-4, wherein the fifth and sixth fastening opening 111-5, 111-6 are arranged in alignment with one another.

A component fastening element 112-2, which penetrates the fifth and sixth fastening opening 111-5, 111-6, and which is adapted to fasten the multi-leg control arm 100 to a vehicle component 114 is not shown in FIG. 3.

As shown in FIG. 3, the first control arm leg 109-1 comprises a first elongated hole 111-1 and the second control arm leg 109-2 comprises a second elongated hole 111-2, wherein the first elongated hole 111-1 and the second elongated hole 111-2 are aligned with each other.

A fastening element 113 of the multi-leg control arm 100, which penetrates the first elongated hole 111-1 and the second elongated hole 111-2, and which is adapted to fix the multi-leg control arm 100 with respect to the axle carrier 107 in a movement position on a movement path 110 in order to set a control arm camber and/or to set the track is not shown in FIG. 3. In particular, the fastening element 113 comprises a screw bolt 113-1 and an eccentric element 113-2, in particular an eccentric disk, connected to the screw bolt 113-1 in a rotationally fixed manner.

In particular, guide elements 117 are arranged on the first, second, third and/or fourth control arm legs 109-1, 109-2, 109-3, 109-4. The fastening element 113, which is not shown in FIG. 3, in particular the eccentric element 113-2, is adapted to bear against the guide elements 117 in order to guide the multi-leg control arm 100 with respect to the axle carrier 107 in a movement position on a movement path 110 in order to set the control arm camber and/or track. Here, the guide elements 117 are formed in particular in one piece with the respective control arm legs 109-1, 109-2, 109-3, 109-4.

When the fastening element 113 is rotated, the fastening element 113, not shown in FIG. 3, in particular the eccentric element 113-2, slides along the respective guide elements 117, in order to move the multi-leg control arm 100 along the movement path 110 relative to the axle carrier 107, which is not shown in FIG. 3.

In particular, the respective guide elements 117 extend at an angle, in particular at right angles, to the movement path 110.

As shown in FIG. 3, the first elongated hole 111-1 and the second elongated hole 111-2 extend along a longitudinal direction 115-1 of the multi-leg control arm 100, the longitudinal direction 115-1 extends from the first control arm leg 109-1 to the third control arm leg 109-3. The fastening element 113, which is not shown in FIG. 3, is thus adapted to fix the multi-leg control arm 100 with respect to the axle carrier 107 in a movement position on a horizontal movement path 110 extending along the longitudinal direction 115-1 in order to set the control arm camber and/or track. As shown in FIG. 3, the respective guide elements 117 extend at an angle, in particular at right angles, to the horizontal movement path 110.

According to an alternative not shown in FIG. 3, the first elongated hole 111-1 and the second elongated hole 111-2 extend along a vertical direction 115-2 of the control arm of the multi-leg control arm 100, wherein the vertical direction 115-2 of the control arm extends from a control arm lower side 119 to a control arm upper side 121 of the multi-leg control arm 100. In this alternative case, the fastening element 113, which is not shown in FIG. 3, is adapted to fix the multi-leg control arm 100 with respect to the axle carrier 107 in a movement position on a vertical movement path 110 extending along the vertical direction 115-2 of the control arm in order to set the control arm camber and/or track. In this alternative case, the respective guide elements 117 extend at an angle, in particular at an right angle, to the vertical movement path 110.

As can be seen from FIG. 3, the guide elements 117 arranged and formed at the respective control arm legs 109-1, 109-2, 109-3, and/or 109-4 are in particular a first guide element 117-1 and a second guide element 117-2, wherein the first guide element 117-1 and the second guide element 117-2 are arranged on opposite sides of the respective elongated hole 111-1, 111-2. In particular, the first and second guide elements 117-1, 117-2 are arranged on both sides of the respective elongated hole 111-1, 111-2.

As can be seen from FIG. 3, the guide elements 117 can be shaped as elevations, in particular ribs, rectangles, squares, triangles, and/or crescents, which in particular are arranged at a control arm outer side 123 of the respective control arm leg 109-1, 109-2, 109-3, 109-4. In particular, the elevations comprise a height between 4 mm and 8 mm, in particular 6 mm. The guide elements 117, which are adapted as elevations, are in particular formed from the base material of the multi-leg control arm 100, the elevations being formed by means of a flow process during a cold forging process initiated by pressure. In particular, aluminum components can be used for the multi-leg control arm 100 and the corresponding guide elements 117.

The guide elements 117 shown in FIG. 3 are in particular formed in one piece with the first control arm leg 109-1 and/or with the second control arm leg 109-2. In particular, the forming of the guide elements 117 is carried out as part of a cold forging process. In the view shown in FIG. 3, the guide elements 117 formed on the control arm outer side 123 of the first control arm leg 109-1 are not visible.

The multi-leg control arm 100 thus provides a mechanically stable connection between the wheel carrier 105 and the axle carrier 107 of the chassis. Thus, the multi-leg control arm 100 according to the present disclosure enables effective absorption of forces which act on the control arm 100 while the vehicle is traveling. In addition, the fastening element 113, in particular screw bolt 113-1 with a non-rotatably connected eccentric element 113-2, ensures effective fixing of the multi-leg control arm 100 with respect to the axle carrier 107 in a movement position on the movement path 110 in order to set the control arm camber and/or track.

In particular, the connecting element 102 comprises a first connecting element edge 131-1, which protrudes beyond the first connecting section 101-1, and in particular the connecting element 102 comprises a second connecting element edge 131-2, which protrudes beyond the second connecting section 101-2. In an alternative example not shown in FIG. 3, the first and/or second connecting element edge 131-1, 131-2 can be aligned flush with the first and/or second connecting section 101-1, 101-2.

In particular, the connecting element 102 comprises at least one recess 133 which extends between the first and second control arm legs 109-1, 109-2, or between the third and fourth control arm legs 109-3, 109-4, wherein the at least one recess 133 is formed in particular as a recess 133 tapering from the respective control arm end 103-1, 103-2.

In particular, a connection element opening 135 is formed in the connection element 102.

In particular, the first connecting section 101-1 comprises a first control arm leg center section 137-1, which is only schematically shown in FIG. 3 and is arranged between the first control arm leg 109-1 and a third control arm leg 109-3 opposite the first control arm leg 109-1. The second connecting section 101-2 comprises a second control arm center section 137-2, which is arranged between the second control arm leg 109-2 and a fourth control arm leg 109-4 opposite the second control arm leg 109-2, wherein in particular the first and second control arm leg center section 137-1, 137-2 extend towards each other in a bent way.

Figure 4:
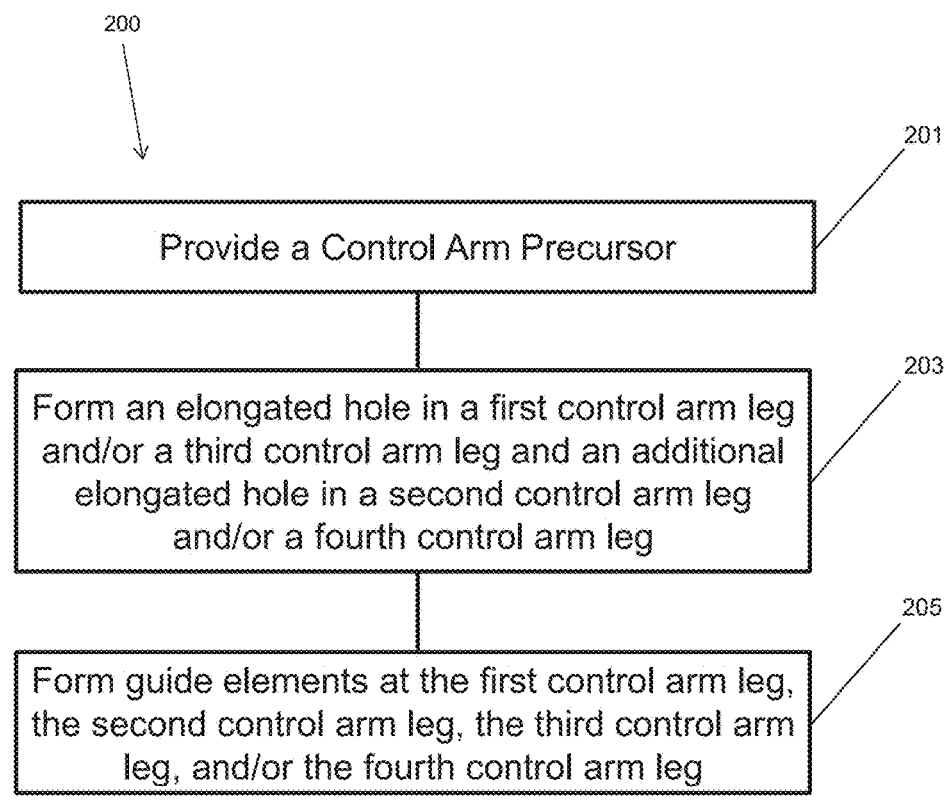
FIG. 4 shows a schematic depiction of a method for producing a multi-leg control arm for a wheel suspension in a vehicle.

FIG. 4 shows a schematic depiction of a method for producing a multi-leg control arm for a wheel suspension in a vehicle.

As a first method step, the method 200 comprises providing 201 a control arm precursor, which comprises a first control arm leg 109-1 and a second control arm leg 109-2, wherein the first control arm leg 109-1 and the second control arm 109-2 are adapted to couple the multi-leg control arm 100 to an axle carrier 107 of the vehicle, and which comprises a third control arm leg 109-3 and a fourth control arm leg 109-4, wherein the third control arm leg 109-3 and the fourth control arm leg 109-4 are adapted to couple the multi-leg control arm 100 to couple a wheel carrier 105 of the vehicle.

As a second method step, the method 200 comprises forming 203 an elongated hole 111-1, 111-3 in the first control arm leg 109-1 and/or third control arm leg 109-3, and an additional elongated hole 111-2, 111-4 in the second control arm leg 109-2, and/or fourth control arm leg 109-4, wherein the elongated hole 111-1, 111-3 and the additional elongated hole 111-2, 111-4 are aligned with one another in order to obtain the multi-leg control arm 100.

In particular, the method 200 comprises, as a third method step, the forming 205 of guide elements 117 at the first, second, third and/or fourth control arm legs 109-1, 109-2, 109-3, 109-4, wherein the guide elements 117 in particular are arranged on both sides of the respective elongated hole 111-1, 111-2, 111-3, 111-4.

In particular, the shaping 205 of the guide elements 117 is carried out as part of a cold forging process.

LIST OF REFERENCE NUMBERS 100 multi-leg control arm
101-1 first connecting section
101-2 second connecting section
102 connecting member
103-1 first control arm end
103-2 second control arm end
105 wheel carrier
105-1 wheel carrier opening
107 axle carrier
107-1 axle carrier opening
109-1 first control arm leg
109-2 second control arm leg
109-3 third control arm leg
109-4 fourth control arm leg
110 movement path
111-1 first elongated hole
111-2 second elongated hole
111-3 third elongated hole
111-4 fourth elongated hole
111-5 fifth fastening opening
111-6 sixth fastening opening
112-1 wheel carrier fastening element
112-2 component fastening element
113 fastening element
113-1 screw bolt
113-2 eccentric element
114 vehicle component
114-1 component opening
115-1 longitudinal direction of control arm
115-2 vertical direction of control arm
117 guide elements
117-1 first guide element
117-2 second guide element
119 control arm lower side
121 control arm top side
123 control arm outside
127 control arm inside
131-1 first connecting element edge
131-2 second connecting element edge
133 recess
135 connecting element opening
137-1 first center section of control arm leg
137-2 second center section of control arm leg
200 method of producing a multi-leg control arm
201 providing a control arm precursor
203 forming a first elongated hole and a second elongated hole
205 forming of guide elements

The invention claimed is:

1. A multi-leg control arm for a wheel suspension in a vehicle, comprising:
a first control arm leg and a second control arm leg, wherein the first control arm leg and the second control arm leg are adapted to couple the multi-leg control arm to an axle carrier of the vehicle,
a third control arm leg and a fourth control arm leg, wherein the third control arm leg and the fourth control arm leg are adapted to couple the multi-leg control arm with a wheel carrier of the vehicle,
wherein the first control arm leg or the third control arm leg comprises a first elongated hole, and the second control arm leg or the fourth control arm leg comprises a second elongated hole,
wherein the first elongated hole and the second elongated hole are aligned with respect to each other and define a movement path of the multi-leg control arm with respect to the axle carrier,
at least one fastening element adapted to penetrate the first elongated hole and the second elongated hole to set a control arm camber or a control arm track by fixing the multi-leg control arm with respect, to the axle carrier or the wheel carrier in a movement position on the movement path,
guide elements formed at one or more of the first control arm leg, the second control arm leg, the third control arm leg, or the fourth control arm leg, wherein the at least one fastening element is adapted to bear at least a portion of the guide elements to guide the multi-leg control arm with respect to the axle carrier or the wheel carrier in the movement position of the movement path to set the control arm camber or the control arm track, wherein the guide elements are formed in one piece with the one or more of the first control arm leg, the second control arm leg, the third control arm leg, or the fourth control arm leg by a cold forging process,
a first connecting section which connects the first control arm leg and the third control arm leg,
a second connecting section which connects the second control arm leg and the fourth control arm leg, and
a connecting element which connects the first connecting section and the second connecting section, wherein the connecting element comprises a first connecting element edge which is at least partially aligned flush with the first connecting section and a second connecting element edge which is at least partially aligned flush with the second connecting section.

2. The multi-leg control arm according to claim 1, wherein the guide elements comprise a first guide element and a second guide element formed at each of the one or more of the first control arm leg, the second control arm leg, the third control arm leg, or the fourth control arm leg, wherein the first guide element and the second guide element are arranged on opposite sides of the first elongated hole and the second elongated hole and face away from each other.

3. The multi-leg control arm according to claim 1, wherein the guide elements comprise ribs formed at an outer side of a respective control arm leg of the one or more of the first control arm leg, the second control arm leg, the third control arm leg, or the fourth control arm leg.

4. The multi-leg control arm according to claim 1, wherein the at least one fastening element comprises a screw bolt and an eccentric element connected in a rotationally fixed manner to the screw bolt, wherein the eccentric element is adapted to bear against at least the portion of the guide elements.

5. The multi-leg control arm according to claim 4, wherein the first control arm leg comprises the first elongated hole and wherein the second control arm leg comprises the second elongated hole, and wherein the screw bolt is configured to be guided through the first elongated hole in the first control arm leg, through an axle carrier opening of the axle carrier, and through the second elongated hole in the second control arm leg to guide the multi-leg control arm with respect to the axle carrier in the movement position on the movement path and to set the control arm camber or the control arm track.

6. The multi-leg control arm according to claim 4, wherein the third control arm leg comprises the first elongated hole and wherein the fourth control arm leg comprises the second elongated hole, and wherein the screw bolt is configured to be guided through the first elongated hole in the third control arm leg, through a wheel carrier opening of the wheel carrier and through the second elongated hole in the fourth control arm leg to guide the multi-leg control arm with respect to the wheel carrier in the movement position on the movement path and to set the control arm camber or the control arm track.

7. The multi-leg control arm according to claim 4, wherein the eccentric element is configured to, when rotated, slide along the portion of the guide elements to move the multi-leg control arm with respect to the one or more of the axle carrier or the wheel carrier along the movement path.

8. The multi-leg control arm according to claim 1, wherein a first fastening opening is formed in the third control arm leg and a second fastening opening is formed in the fourth control arm leg, wherein the first fastening opening and the second fastening opening are arranged in alignment with one another, and wherein the multi-leg control arm comprises a component fastening element configured to fix the multi-leg control arm to a vehicle component of the vehicle by penetrating the first fastening opening and the second fastening opening and a component opening of the vehicle component of the vehicle.

9. The multi-leg control arm according to claim 1, wherein the first elongated hole and the second elongated hole extend along a longitudinal direction of the multi-leg control arm, wherein the longitudinal direction of the multi-leg control arm extends from the first control arm leg to the third control arm leg opposite to the first control arm leg, wherein the at least one fastening element penetrates the first elongated hole and the second elongated hole such that the at least one fastening element is adapted to guide the multi-leg control arm with respect to the axle carrier or the wheel carrier in the movement position along the movement path to set the control arm camber or the control arm track, wherein the movement path comprises a horizontal movement path extending along the longitudinal direction of the multi-leg control arm.

10. The multi-leg control arm according to claim 1, wherein the first elongated hole and the second elongated hole extend along a vertical direction of the multi-leg control arm, wherein the vertical direction of the multi-leg control arm extends from a control arm lower side to a control arm top side of the multi-leg control arm, wherein the at least one fastening element penetrates the first elongated hole and the second elongated hole such that the at least one fastening element is adapted to fix the multi-leg control arm with respect to the axle carrier or the wheel carrier in the movement position along the movement path to set the control arm camber or the control arm track, wherein the movement path comprises a vertical movement path extending along the vertical direction of the multi-leg control arm.

11. A method for producing a multi-leg control arm for a wheel suspension in a vehicle, comprising:
providing a control arm precursor comprising a first control arm leg, a second control arm leg, a third control arm leg, and a fourth control arm leg, wherein the first control arm leg and the second control arm leg are adapted to couple the multi-leg control arm to an axle carrier of the vehicle, wherein the third control arm leg and the fourth control arm leg are adapted to couple the multi-leg control arm to a wheel carrier of the vehicle;
forming a first elongated hole in the first control arm leg or the third control arm leg and a second elongated hole in the second control arm leg or the fourth control arm leg, wherein the first elongated hole and the second elongated hole are aligned with one another; and
forming guide elements at one or more of the first control arm leg, the second control arm leg, the third control arm leg, or the fourth control arm leg, wherein the forming of the guide elements is performed as part of a cold forging process.

12. The method according to claim 11, wherein the guide elements are formed on opposite sides of the first elongated hole and the second elongated hole, and wherein the forming of the first elongated hole and the second elongated hole is performed after the forming of the guide elements.

13. The method according to claim 11, wherein the cold forging process comprises:
applying a lower tool on a side of the multi-leg control arm facing away from the guide elements to be formed, and
applying an upper tool to a side of the multi-leg control arm facing towards the guide elements to be formed, wherein the upper tool comprises molding recesses corresponding to the guide elements to be molded, and wherein the cold forging process comprises applying pressure to the lower tool or the upper tool to form the guide elements in the molding recesses of the upper tool.

14. The method according to claim 11, wherein the cold forging process is carried out at a pressure of at least 200 t.

15. The method according to claim 11, wherein the cold forging process is carried out at a pressure between 250 t and 400 t.

16. The method according to claim 11, further comprising:
providing a first connecting section which connects the first control arm leg and the third control arm leg, a second connecting section which connects the second control arm leg and the fourth control arm leg, and a connecting element which connects the first connecting section and the second connecting section.

17. The method according to claim 16, wherein the connecting element comprises a first connecting element edge which is at least partially aligned flush with the first connecting section and a second connecting element edge which is at least partially aligned flush with the second connecting section.

* * * * *